Patented Oct. 9, 1951

2,571,053

UNITED STATES PATENT OFFICE 2,571,053

MANUFACTURE OF METHYL AMINO PHENOL

Gordon S. Myers, Guelph, Ontario, Canada, assignor to United States Rubber Company, New York, N. Y., a corporation of New Jersey No Drawing. Application April 1, 1947,
Serial No. 738,739

6 Claims. (Cl. 260—574)

This invention relates to the preparation of N-methyl-p-aminophenol, and particularly its preparation from p-aminophenol, formaldehyde, gaseous hydrogen, and a hydrogenating catalyst.

N-methyl-p-aminophenol has been previously prepared by first condensing formaldehyde and p-aminophenol to produce N-methylene-p-aminophenol and subsequently hydrogenating the N-methylene-p-aminophenol (probably as its cyclic trimer). This process is not of extensive commercial value because the reaction products formed by the condensation of the formaldehyde and the p-aminophenol are frequently tarry and contaminate the desired product rendering its isolation and purification difficult. Moreover, the prior methods of the catalytic hydrogenation of methylene aminophenol gave much dimethyl aminophenol which was difficult to separate from the monomethyl aminophenol. N-methyl-p-aminophenol when used in the form of its sulfate as a photographic developer must be in a state of high purity.

It is an object of this invention to produce N-methyl-p-aminophenol from relatively cheap and abundant materials in a high yield and state of purity. I have found that this may be done by catalytically hydrogenating a mixture of p-aminophenol and formaldehyde, in the manner herein described, in the presence of from one to five mols alkali based upon the p-aminophenol. Further, it has been found that the use of 1.5 to 2 mols alkali per mol p-aminophenol is especially beneficial in reducing the time of reaction with maintenance of high yield.

The purpose of the alkali is not clear. It is not solely a question of solubility for if this were the case then the use of one mol alkali would suffice. Suitable alkaline reagents are sodium hydroxide, lithium hydroxide, and potassium hydroxide. Sodium hydroxide is preferred.

Water is the preferred solvent; organic solvents such as alcohol or dioxane need not be used.

The formaldehyde is added concurrently with the gaseous hydrogen and at a rate equivalent to the absorption of the hydrogen. If the formaldehyde is added to the alkaline aminophenol solution at a rate faster than the equivalent amount of gaseous hydrogen, then gums are formed with subsequent low yields. A slight excess of formaldehyde is recommended to be added towards the end of the reaction to keep the product free from unreacted p-aminophenol. No dimethyl-p-aminophenol is formed. These two impurities occur to a considerable extent in the other processes and their removal causes much difficulty.

Due to the mode of addition of formaldehyde and hydrogen, herein, the Schiff's base (condensate of formaldehyde and aminophenol) is immediately reduced to N-monomethylaminophenol before it has a chance to polymerize to tarry products.

The equivalent rate is determined according to the equation:

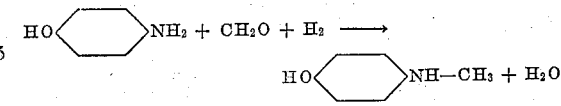

which shows that the formaldehyde is to be added mol for mol with the hydrogen. In actual practice the rate of the formaldehyde addition is conveniently determined by the rate at which the hydrogen is consumed. The formaldehyde may be added as the usual aqueous 37% formaldehyde or as a gas.

A rate of formaldehyde addition faster than an equivalent hydrogen input results in a lowering of yield.

In general, ordinary room temperatures are recommended. High temperatures, e. g., above about 50° C. are to be avoided because of the formation of tarry matter and a corresponding lowering of yield. The minimum useful temperature of reaction is zero °C., the freezing point of water. Pressures varying between atmospheric and several hundred pounds per square inch may be used although from the viewpoint of equipment cost and maintenance, low pressure (10–30 pounds per square inch) are recommended.

At the end of the reaction, the contents are neutralized with a non-oxidizing acid such as phosphoric acid, sulfuric acid, hydrochloric acid, carbon dioxide, etc. The N-methyl-p-aminophenol thus liberated can be separated by extraction with a suitable organic solvent such as butanol, amyl alcohol, ether, ethyl acetate. After separation of the extract the extracting solvent is removed by distillation and the residual N-methyl-p-aminophenol purified by a distillation in vacuum.

Any of the well-known hydrogenation catalysts may be used; however, the Raney nickel catalyst (U. S. Patent No. 1,628,190) is particularly suitable. The quantity of the catalyst may be widely varied. Generally from 0.1% to 10% of the catalyst based on the p-aminophenol may be used. The complete amount of catalyst may be present at the start of the hydrogenation or it may be added gradually during the course of the reduction. The catalyst may be supported on a suitable support such as, for example, kieselguhr, Carborundum, or the like.

The following example is given to illustrate the invention:

*Example*

To an autoclave charged with a solution of 14.4 g. sodium hydroxide in 100–200 cc. water, 21.8 g. p-aminophenol and a catalytic amount of Raney nickel catalyst are added. The contents are well agitated while gaseous hydrogen and 19.6 g. of 37% formaldehyde solution are added simultaneously and equivalently under a pressure of 20 to 55 pounds per square inch over a period of 5 to 7 hours. The addition rates are adjusted by keeping the pressure in the autoclave at 20–55 pounds per square inch while aqueous formaldehyde is added at such a rate that one equivalent of formaldehyde is added for every equivalent of hydrogen consumed, except towards the end of the reaction when a slight excess of formaldehyde is added. The amount of hydrogen consumed at any time is measured by the drop in pressure in the autoclave as recorded on the gauge. When absorption of hydrogen is complete, the pressure is released, the sodium hydroxide is neutralized with concentrated sulfuric acid, preferably out of contact with air or oxygen, and the N-monomethyl-p-aminophenol extracted with 300 cc. butanol. The butanol is distilled from the extract and the residue distilled at 150–160° C. temperature at 5 mm.–10 mm. pressure to give as distillate an 85–90% yield of N-methyl-p-aminophenol.

If N-methyl-p-aminophenol sulfate is desired, the amine is distilled into the recovered butanol and then precipitated as its sulfate by addition of sulfuric acid.

The criticalness of the amount of alkali per mol of p-aminophenol is shown in the following table. The following runs were carried out according to the example:

| Run | Mols alkali/mol aminophenol | Yield N-methyl-p-aminophenol |
| --- | --- | --- |
|  |  | Per cent |
| 1 | 0 | None |
| 2 | 1.05 | 69 |
| 3 | 1.25 | 74–79 |
| 4 | 1.5 | 88–91 |
| 5 | 1.8 | 88–91 |
| 6 | 1.9 | 88–91 |
| 7 | 2.5 | 88–90 |
| 8 | 4.0 | [1] 89 |
| 9 | 7.0 | 20 |

[1] Although this yield is comparable, the time of reaction was an hour longer than the other runs.

Further, it has been observed that when the process is carried out by mixing the formaldehyde, aqueous alkali and aminophenol together, and shaking the resulting solution (containing the Raney nickel catalyst) with hydrogen, only a 49% yield results.

While I have shown and described various embodiments of the invention, it is to be understood that the invention is susceptible to other modifications which appear within the spirit of the invention and the scope of the appended claims.

Having thus described my invention, what I claim and desire to protect by Letters Patent is:

1. A method of preparing N-methyl-p-aminophenol which consists in concurrently adding formaldehyde and gaseous hydrogen to a solution of p-aminophenol in a solvent consisting essentially of an alkali metal hydroxide dissolved in water, said solution containing from 1 to 5 molecular proportions of said alkali metal hydroxide for each molecular proportion of p-aminophenol, in the presence of a catalytic amount of a hydrogenation catalyst, maintaining the reaction temperature at from 0° C. to 50° C., the formaldehyde being added at a rate such that one equivalent thereof is added for every equivalent of hydrogen consumed.

2. A method of preparing N-methyl-p-aminophenol which consists in concurrently adding formaldehyde and gaseous hydrogen to a solution of p-aminophenol in a solvent consisting essentially of an alkali metal hydroxide dissolved in water, said solution containing from 1.5 to 2 molecular proportions of said alkali metal hydroxide for each molecular proportion of p-aminophenol, in the presence of a catalytic amount of a hydrogenation catalyst, maintaining the reaction temperature at from 0° C. to 50° C., the formaldehyde being added at such a rate that one equivalent thereof is added for every equivalent of hydrogen consumed.

3. A method of preparing N-methyl-p-aminophenol which consists in concurrently adding formaldehyde and gaseous hydrogen to a solution of p-aminophenol in a solvent consisting essentially of an alkali metal hydroxide dissolved in water, said solution containing from 1 to 5 molecular proportions of said alkali metal hydroxide for each molecular proportion of p-aminophenol, in the presence of a catalytic amount of a hydrogenation catalyst, maintaining a reaction temperature at from 0° C. to 50° C., the formaldehyde being added at a rate such that one equivalent thereof is added for every equivalent of hydrogen consumed, subsequently neutralizing the reaction mixture with a non-oxidizing acid, and recovering N-methyl-p-aminophenol from the resulting mixture by extraction of the resulting neutralized mixture with an organic solvent for N-methyl-p-aminophenol.

4. The method of claim 1 wherein the hydrogenation catalyst is Raney nickel catalyst.

5. The method of claim 2 wherein the hydrogenation catalyst is Raney nickel catalyst.

6. The method of making N-methyl-p-aminophenol which consists in concurrently adding formaldehyde and gaseous hydrogen to a solution of p-aminophenol in a solvent medium consisting essentially of an aqueous solution of an alkali metal hydroxide in the presence of a catalytic amount of a hydrogenation catalyst, the amount of said alkali metal hydroxide ranging from 1.5 to 2 mols per mol of said p-aminophenol, adding said formaldehyde at a rate molecularly equivalent to the rate at which said hydrogen is consumed, towards the end of the reaction adding a slight excess of formaldehyde to keep the product free from unreacted p-aminophenol, maintaining the reaction temperature at from 0° C. to 50° C., discontinuing the addition of formaldehyde and hydrogen when the absorption of hydrogen is complete, thereby forming a reaction mixture which is free from dimethyl-p-aminophenol and from unreacted p-aminophenol, neutralizing the resulting reaction mixture with a non-oxidizing acid, and recovering the N-methyl-p-aminophenol thus liberated from the resulting neutralized reaction mixture by extraction with an organic solvent for N-methyl-p-aminophenol.

GORDON S. MYERS.

REFERENCES CITED

The following references are of record in the file of this patent:

UNITED STATES PATENTS

| Number | Name | Date |
| --- | --- | --- |
| 1,886,449 | Sommer | Nov. 8, 1932 |
| 2,298,284 | Emerson | Oct. 13, 1942 |

FOREIGN PATENTS

| Number | Country | Date |
| --- | --- | --- |
| 600,426 | Great Britain | Apr. 8, 1948 |
| 913,996 | France | Sept. 25, 1946 |